United States Patent
Appeltans et al.

(10) Patent No.: US 6,812,680 B2
(45) Date of Patent: Nov. 2, 2004

(54) DC/DC CONVERTER HAVING OFFSET VOLTAGE ADDED TO THE FEEDBACK VOLTAGE

(75) Inventors: Koen Emiel Jozef Appeltans, Sint-Truiden (BE); Christian Bruno Gislain Binard, Rixensart (BE)

(73) Assignee: STMicroelectronics N.V., Amsterdam (NL)

( * ) Notice: Subject to any disclaimer, the term of this patent is extended or adjusted under 35 U.S.C. 154(b) by 0 days.

(21) Appl. No.: 10/325,476

(22) Filed: Dec. 18, 2002

(65) Prior Publication Data

US 2003/0151395 A1 Aug. 14, 2003

(30) Foreign Application Priority Data

Dec. 18, 2001 (EP) ............................................. 01403277

(51) Int. Cl.$^7$ ................................................. G05F 1/44
(52) U.S. Cl. ...................................... 323/283; 323/284
(58) Field of Search ................................ 323/283, 284, 323/282

(56) References Cited

U.S. PATENT DOCUMENTS

| | | | |
|---|---|---|---|
| 4,937,722 A | | 6/1990 | Deierlein |
| 5,278,490 A | * | 1/1994 | Smedley .................... 323/284 |
| 5,894,243 A | * | 4/1999 | Hwang ........................ 327/540 |
| 6,518,738 B1 | * | 2/2003 | Wang ........................ 323/284 |

FOREIGN PATENT DOCUMENTS

| | | |
|---|---|---|
| EP | 0 614 266 A1 | 9/1994 |
| EP | 0 735 656 A2 | 10/1996 |

OTHER PUBLICATIONS

Wu, T.F. "Comparison Among Three Types of Dynamic Current Distribution Control Strategies" Singal Processing and Systems Control, Intelligent Sensors and Instrumentation, Proceedings of the International Conference on Industrial Electronics, Control, Instrumentation and Automation (IECON), New York, IEEE, US, vol. 3, Conf. 18, Nov. 9, 1992, pp. 289–294, XP010060708.

Varga, Ljubomir D. et al. "Synthesis of Load–Independent Switch–Mode Power Converters" Conference Record of the Industry Applications Society Annual Meeting (IAS), Oct. 1–5, 1989, pp. 1128–1134, XP010090930.

Khan, Raheel A. et al. "A Systematic Approach to Modeling Current–Mode Controlled Converters", Proceedings of the Annual Power Electronics Specialists Conference (PESC), Seattle, Jun. 20–25, 1993, pp. 388–394, XP010149073.

"Linear Integrated Circuits Data and Applications Handbook", UC1842/3/4/5 Family of Current PWM Controller Data Shee Apr. 1990, Unitrode Integrated Circuits Corporation, XP002214942, pp. 4–160 thru 4–165.

* cited by examiner

Primary Examiner—Shawn Riley
(74) Attorney, Agent, or Firm—Lisa K. Jorgenson; Stephen Bonigini; Fleit, Kain, Gibbons, Gutman, Bongini & Bianco P.L.

(57) ABSTRACT

A DC/DC converter or power supply is provided that includes a switched-mode regulator, a feedback comparator coupled to the regulator, and an offset voltage circuit coupled to the feedback comparator. A feedback voltage is coupled to the feedback comparator, and the offset voltage circuit adds an offset voltage to the feedback voltage during at least one phase of the switched-mode regulator or at least a portion thereof. Also provided is a method for stabilizing of the output signal of a switched-mode regulator of the type that receives a feedback signal from a feedback comparator.

22 Claims, 1 Drawing Sheet

DC/DC CONVERTER HAVING OFFSET VOLTAGE ADDED TO THE FEEDBACK VOLTAGE

FIELD OF THE INVENTION

The present invention relates to a DC/DC converter or power supply with improved stability of the output signal. More specifically, the invention relates to a DC/DC converter.

BACKGROUND OF THE INVENTION

DC/DC converters are well-known. Said known converters are associated to a feedback comparator so as to provide stability to the output signal. The feedback comparator is controlled to switch-over the device as soon as the output voltage exceeds a voltage corresponding to the sum of the reference voltage and an admissible voltage variation or ripple, said admissible voltage variation being as low as possible.

This leads to a too slow working of the comparator, to a large minimum duty cycle and to disturbances at light loads.

SUMMARY OF THE INVENTION

The present invention relates to a DC/DC converter or power supply enabling a rapid working of the comparator, while keeping the ripple or admissible voltage variation as low as possible, whereby reducing or preventing disturbance problems at light loads.

The DC/DC converter or power supply of the invention is a converter or power supply comprising a switched-mode regulator, which is provided or associated to a feedback comparator of a feedback voltage for improving the stability of the output signal.

The DC/DC converter or power supply of the invention is further provided with or associated to a means for adding an offset voltage (positive or negative, preferably positive during a voltage increasing mode) to the feedback voltage during at least one phase of the switched-mode regulator or during a portion of at least one phase.

Advantageously, the means for adding an offset voltage is adapted for adding a fixed offset voltage during only one phase of the switched-mode regulator or a portion of said phase.

Preferably, the converter or power supply has means for detecting when a feedback voltage is higher than the sum (reference voltage+admissible voltage variation). In the converter or power supply of the invention, the feedback comparator detects the voltage difference between the sum (feedback voltage+offset voltage) and the reference voltage, and determines whether said difference is at least equal to, advantageously higher than, a voltage value or a numerical voltage value corresponding to an admissible voltage variation. In said embodiment, the means for adding an offset voltage is adapted for adding an offset voltage having a voltage value higher than the admissible voltage variation or having a numerical voltage value higher than the admissible voltage variation. The numerical value of the offset voltage is preferably comprised between 1 and 10 times the numerical voltage value of the admissible voltage variation, most preferably between 1, 5 and 3 times the numerical voltage value of the admissible voltage variation.

For example, the means for adding an offset voltage is adapted for adding an offset voltage having a voltage value equal to or higher than twice the admissible voltage variation or having a numerical voltage value equal to or higher than twice the admissible numerical voltage variation.

According to specific embodiments, the means for adding an offset voltage is adapted for adding said offset voltage during the mode of the regulator corresponding to a voltage increase mode or a portion thereof and/or for adding a negative offset voltage during the mode of the regulator corresponding to a voltage decrease mode or a portion thereof.

The invention relates also to an electronic device comprising at least one converter or power supply of the invention.

The invention further relates also to a method for improving the stability of a signal of an output signal by means of a regulator receiving a signal from a feedback comparator for a feedback voltage with respect to a reference voltage. In said method, an offset voltage is added to the feedback voltage during at least one phase of the switched-mode regulator or a portion of said phase. The feedback comparator determines the difference between the sum (feedback voltage+offset voltage) and the reference voltage, whereby increasing the reaction speed of the comparator.

Advantageously, a predetermined offset voltage is added to the feedback voltage during only one phase of the switched-mode regulator or a portion thereof.

The feedback voltage has a maximum or minimum allowed voltage value corresponding to the sum of the reference voltage with an admissible voltage variation.

Preferably, an offset voltage having a voltage value at least equal to (advantageously higher than) the admissible voltage variation or having a numerical voltage value at least equal to (advantageously higher than) the admissible voltage variation is added to the feedback voltage during one phase of the switched-mode regulator or a portion thereof.

According to an embodiment of the method of the invention, an offset voltage having a voltage value at least equal to (preferably higher) than twice the admissible voltage variation or having a numerical voltage value at least equal to (preferably higher than) twice the numerical admissible voltage variation is added to the feedback voltage during one phase of the switched-mode regulator or a portion of said phase.

According to a detail of an embodiment, an offset voltage is added to the feedback voltage during the voltage increase mode of the regulator or a portion of said phase and/or a negative offset voltage is added to the feedback voltage during the voltage decrease mode of the regulator or a portion of said phase. Said offset voltage and negative offset voltage can have the same numerical value or different numerical value.

BRIEF DESCRIPTION OF THE DRAWINGS

Details of the invention will appear from the following description given as an example only and with reference to the attached drawings wherein.

DETAILED DESCRIPTION OF PREFERRED EMBODIMENTS

Figure 1:
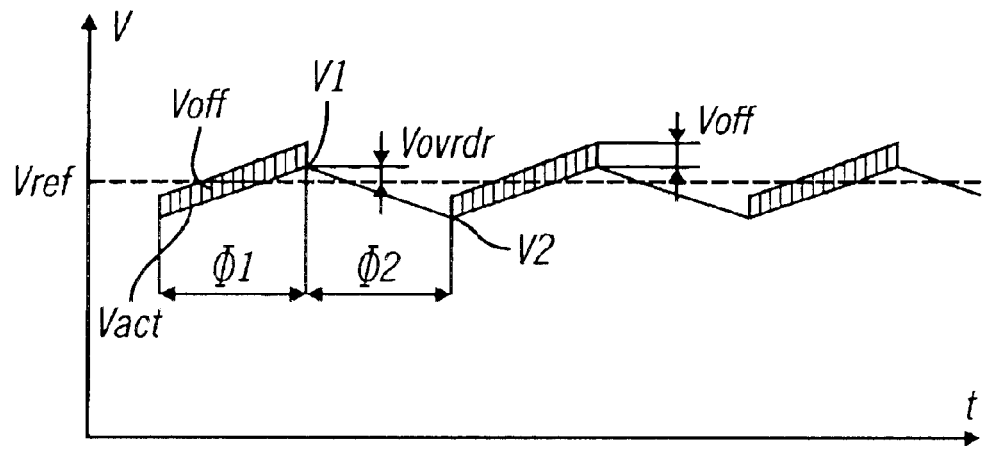
FIG. 1 is a schematic view showing the working of a DC/DC converter of the invention.

FIG. 1 shows schematically the working of a DC/DC converter or power supply of the invention.

The converter is adapted for maintaining the voltage V during the time around a reference voltage Vref.

The converter, without the modification of the invention, is working so as to detect when the actual voltage has a value higher than (Vref+Vovrdr) in which Vovrdr is the maximum admissible voltage variation or ripple at which the switching of the regulation is carried out so as to decrease the Voltage to a value lower than Vref. As Vovrdr has a low value for having the best as possible voltage stability, the detection of such a low voltage value is more complicated and requires more time, whereby the working of the converter is slow, leading to a large minimum duty cycle and creating disturbances at light loads.

In the converter of the invention, a fixed offset voltage Voff is added to the feedback voltage (Vact), and the sum (Vact+Voff) is applied to the comparator. Said addition is made during the increasing phase of the voltage (φ1) of the switched-mode regulator, the phase φ2 being the decreasing phase of the voltage of the switched-mode regulator.

By adding said fixed offset voltage Voff, the detection of an overdriven voltage with respect to the reference voltage Vref is easier, as the comparator has to detect a voltage difference between the sum actual voltage+offset voltage, and the reference voltage (Vref). When the voltage difference Vact+Voff−Vref is higher than or equal to Vovrdr, the switch is actuated so as to reduce the voltage V1 to V2.

In the example of FIG. 1, Voff is equal to about twice the admissible voltage variation Vovrdr above the reference voltage.

Figure 2:
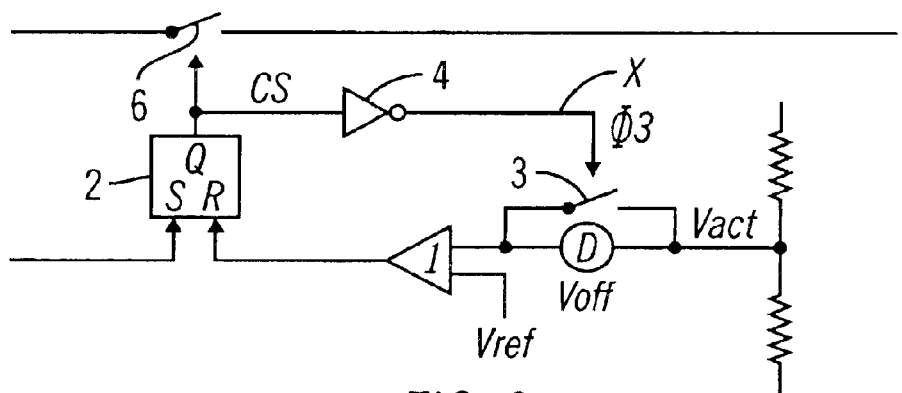
FIG. 2 is a schematic view of a DC/DC converter of the invention.

The device shown in FIG. 2 is a device suitable for ensuring a voltage regulation as shown in FIG. 1. The device comprises a comparator 1 receiving a signal corresponding to the reference voltage Vref, and a signal corresponding to the sum of a feedback signal (Vact) and an offset signal Voff coming for example from a battery or another voltage source D. Said feedback signal (Vact) increased with the offset voltage Voff is sent to the comparator 1 during one phase of the switched-mode regulator 2 (phase φ1 or phase corresponding to an increase of the voltage V).

For this purpose, a switch 3 is used. Said switch 3 is operated by a signal X issuing from an inverter 4 receiving a signal CS from the regulator 2. In open position of the switch 3 (position shown in FIG. 2), Vact is increased with Voff before being sent to the comparator 1. In closed position of the switch 3, Vact is directly applied to the comparator 1.

As soon as the comparator detects whether the difference between (Vact+Voff)−Vref is higher than or equal to Vovrdr, a signal is sent to the regulator 2 so as to control the switch so as to reduce the voltage below the reference voltage (drop from V1 to V2).

The same principle can be used for the decreasing phase of the voltage. In this case, it is possible to speed up the working of the comparator, as well for the increasing phase as for the decreasing phase of the comparator.

Figure 3:
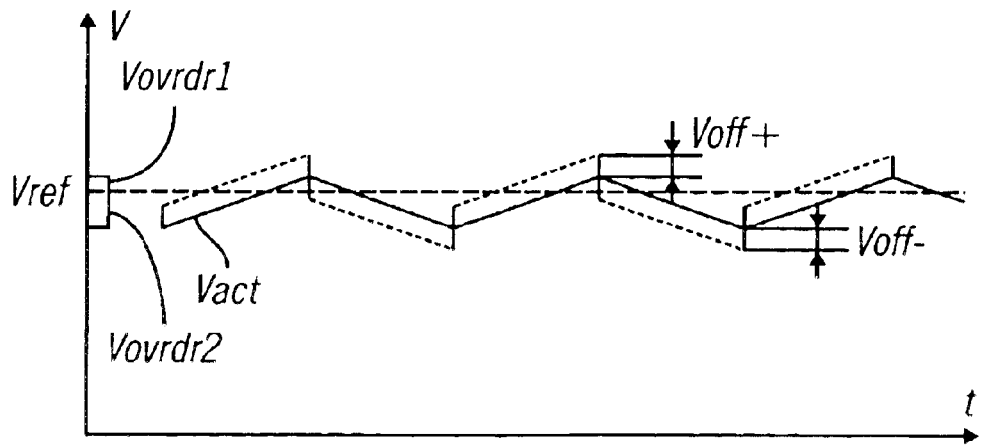
FIG. 3 is a schematic view showing the working of another DC/DC converter of the invention.

FIG. 3 shows schematically a voltage curve in function of the time. During phase φ1, an offset voltage Voff+ is added to the actual voltage, while during a decreasing phase φ2, a negative offset voltage Voff− is added to the actual voltage.

The comparator detects then when the difference between (Vact+Voff+) and Vref is higher than +Vovrdr1 and when the difference (as numerical value) between Vref and (Vact+Voff−) is higher than −Vovrdr2. (Vact is the actual voltage; Voff+ is a positive voltage added to the actual voltage during the phase φ1, Vovrdr1 is the admissible voltage variation during the phase φ1, Voff− is a negative offset voltage added to the actual voltage during the phase φ2, and Vovrdr2 is the admissible voltage variation during the phase φ2).

What is claimed is:

1. A DC/DC converter or power supply comprising:
   a switched-mode regulator;
   a feedback comparator coupled to the regulator;
   an offset voltage circuit coupled to the feedback comparator, a feedback voltage being coupled to the offset voltage circuit, the offset voltage circuit adding a fixed offset voltage to the feedback voltage during at least a portion of one phase of the switched-mode regulator, and the sum of the feedback voltage and the fixed offset voltage being coupled to the feedback comparator during at least the portion of the one phase of the switched-mode regulator.

2. The DC/DC converter or power supply according to claim 1, wherein the offset voltage circuit adds the fixed offset voltage to the feedback voltage during only one phase of the switched-mode regulator.

3. The DC/DC converter or power supply according to claim 1,
   wherein the offset voltage circuit adds fixed offset voltage to the feedback voltage during only one phase of the switched-mode regulator, and the fixed offset voltage has a negative value.

4. The DC/DC converter or power supply according to claim 1,
   wherein the a fixed offset voltage added to the feedback voltage during at least the portion of the one phase of the switched-mode regulator has a positive value, and
   the offset voltage circuit adds a second fixed negative offset voltage to the feedback voltage during at least a portion of another phase of the switched-mode regulator, the second fixed offset voltage having a negative value.

5. The DC/DC converter or power supply according to claim 1, wherein during at least the portion of the one phase of the switched-mode regulator the feedback comparator detects a voltage difference between a reference voltage and the sum of the feedback voltage and the fixed offset voltage, and determines whether the voltage difference is at least equal to an admissible voltage variation value.

6. The DC/DC converter or power supply according to claim 5, wherein the fixed offset voltage is equal to or higher than twice the admissible voltage variation value.

7. The DC/DC converter or power supply according to claim 1, wherein the offset voltage circuit adds the fixed offset voltage to the feedback voltage during an increasing voltage mode of the regulator.

8. The DC/DC converter or power supply according to claim 1,
   wherein the fixed offset voltage has a negative value, and
   the offset voltage circuit adds the fixed offset voltage to the feedback voltage during a decreasing voltage mode of the regulator.

9. An electronic device including at least one DC/DC converter or power supply, said at least one DC/DC converter or power supply comprising:
   a switched-mode regulator;
   a feedback comparator coupled to the regulator;
   an offset voltage circuit coupled to the feedback comparator, a feedback voltage being coupled to the offset voltage circuit, the offset voltage circuit adding a fixed offset voltage to the feedback voltage during at least a portion of one phase of the switched-mode regulator, and the sum of the feedback voltage and the fixed offset voltage being coupled to the feedback comparator during at least the portion of the one phase of the switched-mode regulator.

10. The electronic device according to claim 9, wherein the offset voltage circuit adds the fixed offset voltage to the feedback voltage during only one phase of the switched-mode regulator.

11. The electronic device according to claim 9,
wherein the fixed offset voltage added to the feedback voltage during at least the portion of the one phase of the switched-mode regulator has a positive value, and
the offset voltage circuit adds a second fixed offset voltage to the feedback voltage during at least a portion of another phase of the switched-mode regulator, the second fixed offset voltage having a negative value.

12. The electronic device according to claim 9, wherein during at least the portion of the one phase of the switched-mode regulator the feedback comparator detects a voltage difference between a reference voltage and the sum of the feedback voltage and the fixed offset voltage, and determines whether the voltage difference is at least equal to an admissible voltage variation value.

13. The electronic device according to claim 12, wherein the fixed offset voltage is equal to or higher than twice the admissible voltage variation value.

14. The electronic device according to claim 9, wherein the offset voltage circuit adds the fixed offset voltage to the feedback voltage during an increasing voltage mode of the regulator.

15. The electronic device according to claim 9,
wherein the fixed offset voltage has a negative value, and
the offset voltage circuit adds the negative fixed offset voltage to the feedback voltage during a decreasing voltage mode of the regulator.

16. A method for improving stability of an output signal of a switched-mode regulator of the type that receives a feedback signal, with a reference voltage being coupled to a feedback comparator, said method comprising the steps of:
receiving a feedback voltage;
adding a fixed offset voltage to the feedback voltage during at least a portion of one phase of the switched-mode regulator; and
determining a difference between the reference voltage and the sum of the feedback voltage and the fixed offset voltage during at least the portion of the one phase of the switched-mode regulator.

17. The method according to claim 16, wherein in the adding step, the fixed offset voltage is added to the feedback voltage during only one phase of the switched-mode regulator.

18. The method according to claim 16, wherein the adding step includes the sub-steps of:
adding the fixed offset voltage to the feedback voltage during at least the portion of the one phase of the switched-mode regulator, the fixed offset voltage having a positive value; and
adding a second fixed offset voltage to the feedback voltage during at least a portion of another phase of the switched-mode regulator, the second fixed offset voltage having a negative value.

19. The method according to claim 16,
wherein the feedback voltage has a maximum or minimum allowed voltage value corresponding to a sum of the reference voltage and an admissible voltage variation value, and
the fixed offset voltage is equal to or higher than the admissible voltage variation value.

20. The method according to claim 19, wherein the fixed offset voltage is higher than twice the admissible voltage variation value.

21. The method according to claim 16, wherein in the adding step, the fixed offset voltage is added to the feedback voltage during an increasing voltage mode of the regulator.

22. The method according to claim 16,
wherein the fixed offset voltage has a negative value, and
in the adding step, the fixed offset voltage is added to the feedback voltage during a decreasing voltage mode of the regulator.

* * * * *

UNITED STATES PATENT AND TRADEMARK OFFICE
CERTIFICATE OF CORRECTION

PATENT NO. : 6,812,680 B2
DATED : November 2, 2004
INVENTOR(S) : Koen Emiel Jozef Appeltans et al.

It is certified that error appears in the above-identified patent and that said Letters Patent is hereby corrected as shown below:

Title page,
Item [74], *Attorney, Agent or Firm*, change "Stephen Bonigini" to -- Stephen Bongini --.

Column 4,
Line 24, change "adds fixed" to -- adds the fixed --.
Line 30, change "the a fixed" to -- the fixed --.
Lines 33-34, change "fixed negative offset" to -- fixed offset --.

Column 5,
Line 35, change "the negative fixed" to -- the fixed --.

Signed and Sealed this

Twenty-second Day of February, 2005

JON W. DUDAS
*Director of the United States Patent and Trademark Office*